(12) United States Patent
Wilkins

(10) Patent No.: US 10,302,199 B2
(45) Date of Patent: May 28, 2019

(54) MECHANICAL SEAL FOR ROTARY MACHINE

(71) Applicant: Wilkins IP, LLC, New Albany, IN (US)

(72) Inventor: Stephen P. Wilkins, Floyds Knobs, IN (US)

(73) Assignee: Wilkins IP, LLC, New Albany, IN (US)

( * ) Notice: Subject to any disclaimer, the term of this patent is extended or adjusted under 35 U.S.C. 154(b) by 0 days.

(21) Appl. No.: 15/634,591

(22) Filed: Jun. 27, 2017

(65) Prior Publication Data

US 2018/0372221 A1 Dec. 27, 2018

(51) Int. Cl.
| | |
|---|---|
| *F04C 15/00* | (2006.01) |
| *F16J 15/32* | (2016.01) |
| *F16J 15/328* | (2016.01) |
| *F16J 15/34* | (2006.01) |
| *F04C 27/00* | (2006.01) |
| *F04D 29/12* | (2006.01) |
| *F04D 29/043* | (2006.01) |
| *F04D 29/053* | (2006.01) |
| *F16J 15/16* | (2006.01) |

(52) U.S. Cl.
CPC ............ *F16J 15/32* (2013.01); *F16J 15/328* (2013.01); *F16J 15/348* (2013.01); *F04C 15/0038* (2013.01); *F04C 27/009* (2013.01); *F04D 29/043* (2013.01); *F04D 29/053* (2013.01); *F04D 29/12* (2013.01); *F16J 15/164* (2013.01)

(58) Field of Classification Search
CPC .. F04C 15/0038; F04C 27/009; F04D 29/043; F04D 29/053; F04D 29/12; F16J 15/164
See application file for complete search history.

(56) References Cited

U.S. PATENT DOCUMENTS

| | | | | |
|---|---|---|---|---|
| 4,854,828 A | * | 8/1989 | Haentjens | F04D 13/021 417/360 |
| 4,915,579 A | * | 4/1990 | Whittier | F04D 29/146 277/347 |
| 2007/0132191 A1 | * | 6/2007 | Werner | F04C 15/0038 277/408 |
| 2007/0224036 A1 | * | 9/2007 | Yandle, II | F04D 13/08 415/170.1 |
| 2012/0099984 A1 | * | 4/2012 | Abarca Melo | F04D 29/126 415/229 |
| 2015/0300352 A1 | * | 10/2015 | Walters | F04C 2/3448 418/104 |
| 2017/0198813 A1 | * | 7/2017 | Itadani | F16J 15/32 |

* cited by examiner

*Primary Examiner* — Eugene G Byrd
(74) *Attorney, Agent, or Firm* — Lee & Hayes, P.C.

(57) ABSTRACT

A seal for a rotary machine may include an end cap configured to be coupled to the rotary machine. The end cap may define an end face and a bore. The seal may also include a sleeve received through the bore of the end cap and configured to receive a shaft associated with the rotary machine. The seal may also include a collar coupled to the sleeve and configured to couple the sleeve to the shaft associated with the rotary machine. The seal may further include a spacer coupled to the end face of the end cap, in a first position, such that at least a portion the spacer is between the collar and the end face of the end cap, and, in a second position, such that the portion of the spacer is not between the collar and the end face of the end cap.

13 Claims, 4 Drawing Sheets

MECHANICAL SEAL FOR ROTARY MACHINE

BACKGROUND

A rotary machine such as a fluid pump often includes a rotating shaft passing through a chamber in flow communication with a fluid. This may create a potential path from which fluid may leak at the location from which the shaft exits the chamber. For example, a flow path may be created around the rotating shaft that allows fluid to leak from the chamber. To prevent or reduce fluid flow through this path, a seal may be provided to seal the path between the shaft and a portion of the rotary machine through which the rotating shaft passes. Such a seal may involve providing a rotatable portion coupled to the rotating shaft and a stationary portion coupled to the non-rotating portion of the rotary machine, and the effectiveness of the fluid seal may rely on interaction between the rotatable portion and the stationary portion. As a result, it may be important to install the rotatable portion on the shaft and the stationary portion on the non-rotating portion of the rotary machine such that an effective fluid seal is provided. In some seals, this installation may be difficult, and thus, the effectiveness of the fluid seal may be compromised.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
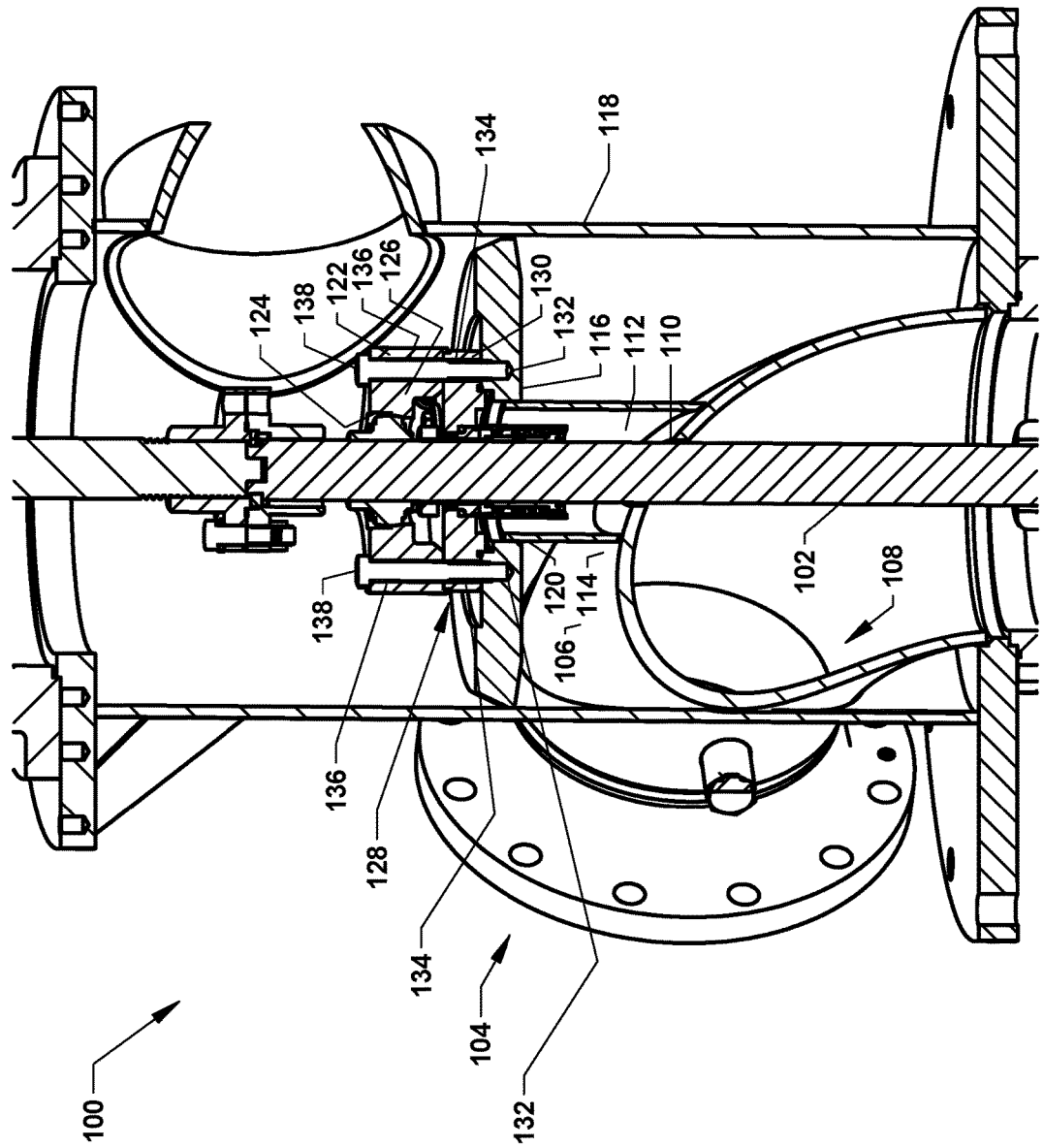
FIG. 1 is a perspective partial section view of an example rotary machine including an example seal.

As mentioned above, a rotary machine such as a fluid pump may include a rotating shaft passing through a chamber in flow communication with a fluid. This may create a potential path from which fluid may leak. A seal may be provided to seal the path between the shaft and a portion of the rotary machine through which the shaft passes. Such a seal may include a rotatable portion coupled to the shaft and a stationary portion coupled to a non-rotating portion of the rotary machine, and the effectiveness of the seal may rely on interaction between the rotatable portion and the stationary portion. As a result, it may be important to install the rotatable portion on the shaft and the stationary portion the non-rotating portion of the rotary machine, such that an effective fluid seal is provided. In some seals, this installation may be difficult, and thus, the effectiveness of the seal may be compromised. Some example disclosed herein may address or mitigate the above-noted drawbacks.

This disclosure is generally directed to a seal for providing at least a partial fluid seal (e.g., a complete fluid seal) between a rotating shaft and a chamber in flow communication with a fluid for a rotary machine, such as, for example, a fluid pump. Other types of rotary machines are contemplated.

In some examples, a seal may include an end cap configured to be coupled to the rotary machine. The end cap may define an end face and a bore, and the seal may further include a sleeve received through the bore of the end cap and configured to receive a shaft associated with the rotary machine. The seal may also include a collar coupled to the sleeve and configured to couple the sleeve to the shaft associated with the rotary machine. The seal may further include a spacer coupled to the end face of the end cap, in a first position, such that at least a portion of the spacer is between the collar and the end face of the end cap, and, in a second position, such that the portion of the spacer is not between the collar and the end face of the end cap.

In some examples, the spacer may facilitate proper installation of the seal to provide a more effective fluid seal to prevent a possible fluid path between the rotating shaft and a portion of the rotary machine through which the rotating shaft passes, for example, prior to operation of the rotary machine. For example, the seal may include a rotating seal face configured to rotate with the rotating shaft of the rotary machine, a stationary seal face coupled to the portion of the rotary shaft through which the rotating shaft passes. The rotating seal face and the stationary seal face may be configured to abut and slide relative to one another and provide a fluid seal. In some examples, the spacer may have a predetermined thickness that facilitates proper pre-loading of a spring associated with the seal that urges the rotating and stationary seal faces of the seal against one another to improve the effectiveness of the seal prior to operation. For example, the pre-load may be important to provide an effective seal before operation of the rotary machine (e.g., a pump) at its operating pressure. In some examples, once the pump has reached its operating pressure, the fluid pressure in the pump may assist with providing sufficient load to provide an effective seal.

In some examples, by coupling the spacer to the end cap in the first position, it may prevent the spacer from separating from the seal, for example, during shipment and/or installation in the rotary machine. For example, if the spacer were to be held in the first position by only friction between the collar and the end cap by the pre-load provided by the spring, the spacer may become separated from the seal during shipment or prior to installation of the seal in the rotary machine. In such cases, the proper pre-load of the spring may not be maintained, and the seal may be installed without the proper pre-load, possibly resulting in a less effective seal than desired prior to operation. In some examples, by coupling the spacer to the end cap in the second position, it may prevent the spacer from separating from the seal once installed in the rotary machine, for example, during subsequent operation of the rotary machine, which may result in noise or possible damage to the rotary machine and/or the seal, for example, as the spacer bounces loosely in the rotary machine during operation.

In some examples, the spacer may be configured to be selectively moved between the first position and the second position. For example, the seal may also include a fastener coupling the spacer to the end cap. In some examples, the spacer may include a plate defining a first surface and a second surface opposing the first surface, and the first surface and the second surface may be substantially parallel to one another. In some examples, the plate may include an aperture for receiving the fastener for coupling the spacer to the end cap. For example, the aperture may be positioned in the plate, so that the spacer may be pivoted relative to the collar and the sleeve in a plane substantially parallel to the end face of the end cap. In this example manner, the spacer may be moved to the first position, such that at least a portion the spacer is between the collar and the end face of the end cap, and the fastener may be tightened to secure the spacer in the first position, for example, during installation of the seal on the rotary machine. In addition, following installation, the fastener may be loosened and the spacer may be pivoted such that the spacer is in the second position, such that no portion of the spacer is between the collar and the end face of the end cap. Thereafter, the fastener may be tightened to secure the spacer in the second position. This may prevent the collar from rotating against the spacer, which may damage the collar and/or other portion of the rotary machine or seal. In some examples, the seal may include two or more spacers circumferentially spaced about the collar. For example, the seal may include two spacers at diametrically opposed positions about the collar.

In some examples of the seal, the collar may include an end surface facing and spaced from the end face of end cap, and the spacer may include a first surface facing the end face of the end cap and a second surface facing the end surface of the collar. In some examples, the first surface and/or the second surface may have a coefficient of friction less than 0.2, for example, less than 0.15, 0.10, or 0.05. For example, the first surface and/or the second surface of the spacer may include polytetrafluoroethylene, for example, in the form of a coating or impregnation. In some examples, the spacer may be formed from polytetrafluoroethylene. Other low friction materials are contemplated. Providing the spacer with a low friction material may mitigate or prevent damage to the spacer, the collar, other portions of the seal, and/or the rotary machine if the spacer is not moved from the space between the collar and the end cap after setting the pre-load of the spring in the seal.

In some examples of the seal, the sleeve may define an inner cylindrical surface defining an annular recess, and the seal may further include a tightening ring received in the annular recess. The tightening ring may be configured to couple the sleeve to the shaft of the rotary machine. In some examples, the collar may be longitudinally aligned with the tightening ring on the sleeve, and the seal may further include a fastener extending radially through the collar and contacting an outer surface of the tightening ring, such that, when installed in the rotary machine, the fastener presses the tightening ring against the shaft of the rotary machine. Some examples may include two or more fasteners circumferentially spaced around the collar and configured to contact the outer surface of the tightening ring. Some examples of the seal may also include a set screw extending radially through the collar and contacting an outer cylindrical surface of the sleeve, thereby coupling the collar to the sleeve. Some examples may include two or more set screws circumferentially spaced around the collar and configured to contact the outer surface of the outer cylindrical surface of the sleeve. In some examples, the tightening ring may facilitate coupling the sleeve to the shaft of the rotary machine without marring or damaging the surface of the shaft. This may render it easier to disassemble parts from the shaft that are unassembled by sliding over the portion of the shaft to which the collar and sleeve are coupled.

In some examples, the seal may include an end cap configured to be coupled to the rotary machine, and a sleeve received through a bore of the end cap and configured to be coupled to the shaft of the rotary machine. In some examples, the sleeve may define an inner cylindrical surface defining an annular recess, and the seal may also include a tightening ring received in the annular recess. The tightening ring may be configured to couple the sleeve to the shaft of the rotary machine. The seal may also include a collar longitudinally aligned with the tightening ring and coupled to the sleeve, and a fastener extending radially through the collar and contacting the tightening ring. In some examples, the fastener may be configured to press the tightening ring against the shaft of the rotary machine. The seal may also include a set screw extending radially through the collar and contacting an outer cylindrical surface of the sleeve, thereby coupling the collar to the sleeve, for example, as described previously herein.

Such examples of the seal may also include a spacer coupled to the end face of the end cap, in a first position, such that at least a portion the spacer is between the collar and the end face of the end cap, and, in a second position, such that the portion of the spacer is not between the collar and the end face of the end cap, for example, as described previously herein. For example, the spacer may be configured to be selectively moved between the first position and the second position, for example, as described previously herein. In some examples, the spacer may have one or more characteristics, for example, such as those described previously herein.

This disclosure is also generally directed to a rotary machine including a seal. For example, the rotary machine may include a shaft configured to be driven by a motor, and a chamber configured to be in flow communication with a fluid associated with the rotary machine. The rotary machine may also include a seal coupled to the shaft and the chamber, and configured to provide at least a partial fluid seal (e.g., a complete fluid seal) between the chamber and a portion of the rotary machine exterior with respect to the seal and the chamber. The seal may have one or more characteristics, for example, such as those described previously herein.

This disclosure is also generally directed to a method for installing a seal on a rotary machine including a shaft. The method may include providing a seal including an end cap defining an engagement face, an end face, and a bore. The seal may also include a sleeve received through the bore of the end cap, and a collar coupled to the sleeve adjacent the end face of the end cap. In some examples, the sleeve may be positioned within the bore of the end cap, such that a portion of a spacer coupled to the end face of the end cap is in a first position between and contacted by the end face of the end cap and an end surface of the collar. In some examples, the method may include moving the sleeve onto the shaft of the rotary machine, such that the engagement face of the end cap abuts a portion of the rotary machine through which the shaft passes and rotates. The method may also include coupling the end cap to the portion of the rotary machine. The method may further include coupling the collar and the sleeve to the shaft of the rotary machine, and moving the portion of the spacer from the first position between the end face of the end cap and the end surface of the collar to a second position in which the portion of the spacer is not between the end face of the end cap and the end surface of the collar.

In some examples of the method, the spacer may be moveably coupled to the end cap, and moving the portion of the spacer from the first position to the second position may include pivoting the spacer relative to the collar and the sleeve in a plane substantially parallel to the end face of the end cap. In some examples, the method may further include securing the spacer in a fixed position relative to the end cap after moving the portion of the spacer from the first position to the second position. In some examples, the seal may include a rotating seal face configured to rotate with the sleeve and a stationary seal face coupled to the end cap, and the rotating seal face and the stationary seal face may be configured to abut and slide relative to one another. In some examples of the method, positioning the sleeve within the bore of the end cap such that the portion of the spacer coupled to the end cap is in the first position may include pre-loading a spring biasing the rotating seal face and the stationary seal face against one another.

The techniques and systems described herein may be implemented in a number of ways. Example implementations are provided below with reference to the figures.

FIG. 1 is a perspective partial section view of an example rotary machine 100 including a shaft 102 and a tubular exit 104 including an elbow 106 through which fluid passes. The example rotary machine 100 partially shown is a pump configured to pump fluid through a passage 108 and out the tubular exit 104, for example, via the elbow 106. Other types of rotary machines are contemplated. The example elbow 106 includes an aperture 110 through which the shaft 102 passes. The example aperture 110 is slightly oversized relative to the outer diameter of the shaft 102 to provide clearance for the shaft 102 as it rotates about its axis.

Figure 2:
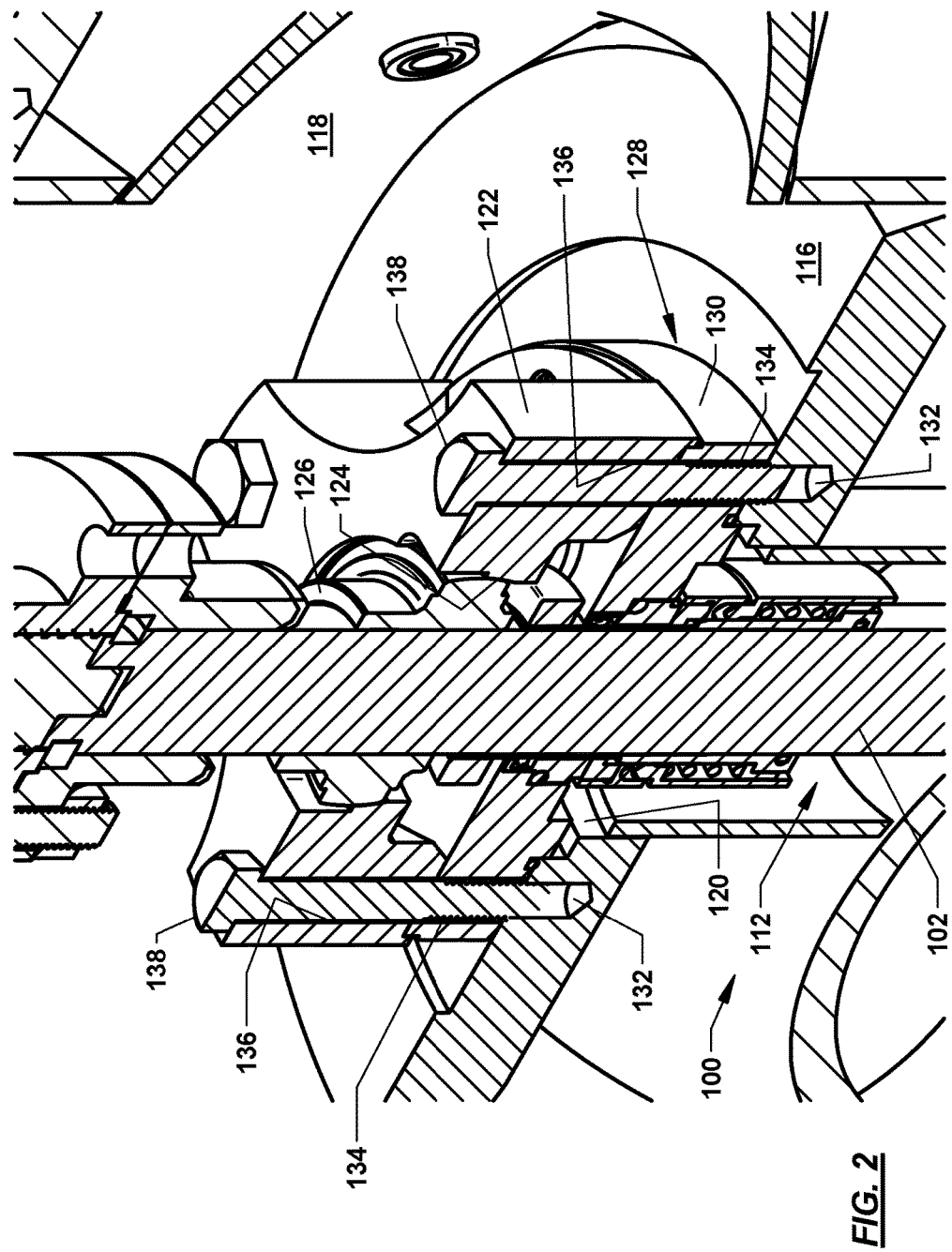
FIG. 2 is a detailed perspective partial section view of the example rotary machine and example seal shown FIG. 1.

The example rotary machine 100 shown in FIGS. 1 and 2 also includes a cylindrical chamber 112 extending from the outer surface 114 of the elbow 106 around the aperture 110 and to a bulkhead 116 of the rotary machine 100. In the example shown, the rotary machine 100 includes a substantially cylindrical housing 118 partially containing the elbow 106, containing the chamber 112, and containing the bulkhead 116. In the example shown, the bulkhead 116 couples the chamber 112 to the housing 118 and provides a bore 120 through which the shaft 102 passes. The example rotary machine 100 also includes a bearing mount 122 coupled indirectly to the bulkhead 116, for example, as explained herein. The bearing mount 122 includes a bearing aperture 124 receiving therein a bearing 126 (e.g., a ball or roller bearing) receiving the shaft 102, such that the shaft 102 is stabilized by the bulkhead 116 and rotation is facilitated by the bearing 126.

As shown in FIGS. 1 and 2, the example rotary machine 100 also includes a seal 128 configured to provide a fluid seal between the chamber 112 and the side of the bulkhead 116 opposite the chamber 112, for example, between the shaft 102 and the bore 120 in the bulkhead 116. In the example shown, the seal 128 includes an end cap 130 coupled to the bulkhead 116 and the bearing mount 122. The example bulkhead 116 includes threaded bolt-receiving blind holes 132, and the example end cap 130 and example bearing mount 122 include corresponding bores 134 and 136, respectively, configured to receive bolts 138 that secure the end cap 130 of the seal 128 and the bearing mount 122 to the bulkhead 116. The example shown includes four blind holes 132, four of each of the bores 134 and 136, and four bolts 138. Other numbers of holes, bores, and fasteners are contemplated, and other structures for securing the bulkhead 116, the bearing mount 122, and the end cap 130 of the seal 128 are contemplated.

Figure 3:
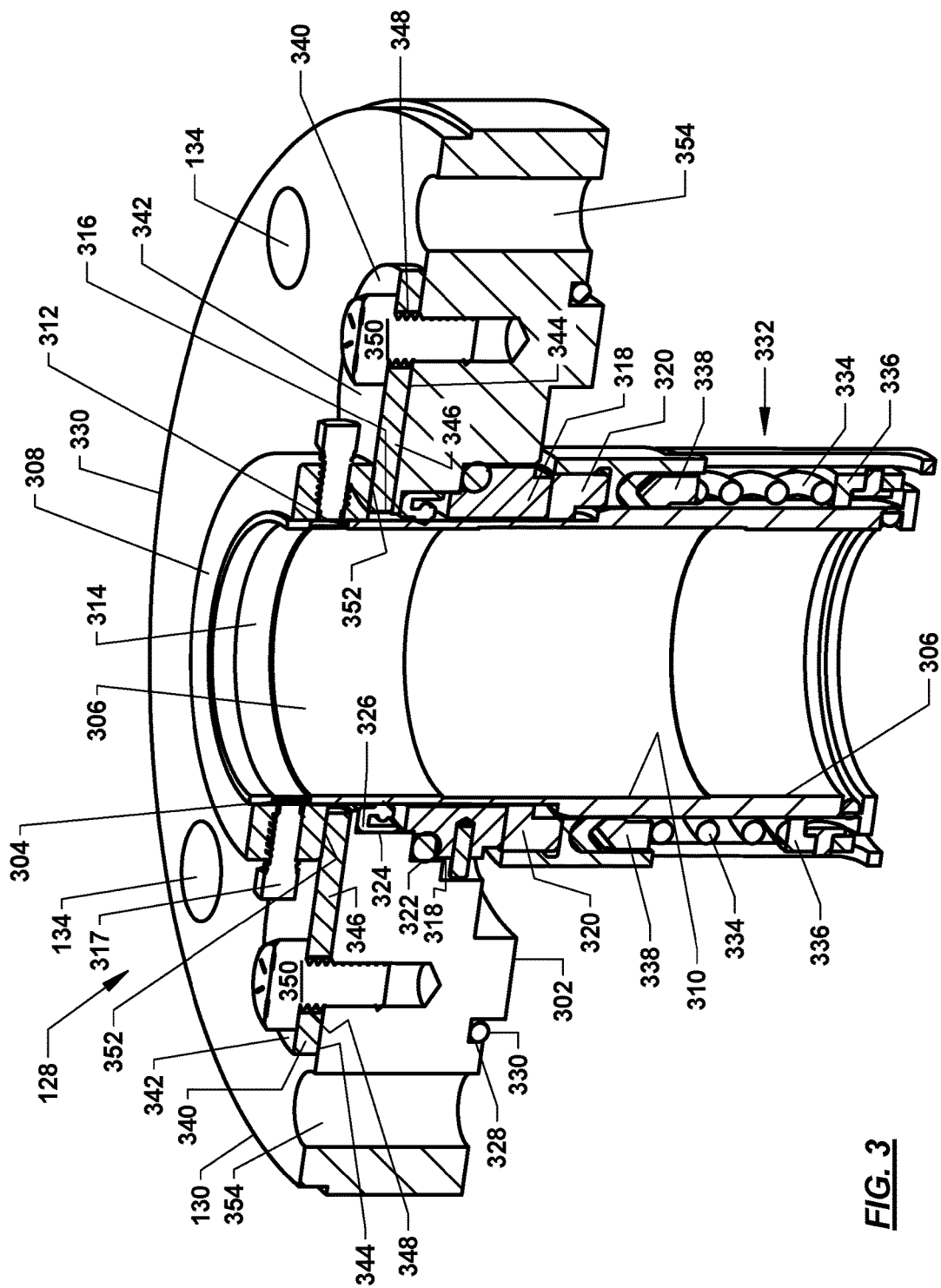
FIG. 3 is a perspective partial section view of the example seal shown in FIGS. 1 and 2.

FIG. 3 is a perspective partial section view of the example seal 128 shown in FIGS. 1 and 2, and as shown in FIG. 3, the example end cap 130 of the example seal 128 defines an end face 300, an engagement face 302 opposite the end face 300, and a bore 304. The end face 300 may define a plane transverse (e.g., substantially perpendicular) to the longitudinal axis of the bore 304, which receives the shaft 102 of the rotary machine 100. The engagement face 302 may be configured to abut the bulkhead 116 and form a substantially fluid-tight seal with an abutting surface of the bulkhead 116.

The example seal 128 also includes a sleeve 306 received through the bore 304 of the end cap 130 and configured to receive the shaft 102 associated with the rotary machine 100. In some examples, the sleeve 306 may be configured to be coupled to the shaft 102. For example, the seal 128 may also include an annular collar 308 coupled to the sleeve 306 and configured to couple the sleeve 306 to the shaft 102. For example, the sleeve 306 may define an inner cylindrical surface 310 defining an annular recess 312. The seal 128 may further include a tightening ring 314 received in the annular recess 312. The tightening ring 314 may be configured to couple the sleeve 306 to the shaft 102. For example, the collar 308 may be longitudinally aligned with the tightening ring 314 on the sleeve 306 at a portion of the outer cylindrical surface 316 of the sleeve 306 extending through the bore 304 and beyond the end face 300 of the of the end cap 130 (opposite the bulkhead 116), and the seal 128 may further include one or more fasteners 317 (e.g., bolts at different circumferential positions) extending radially through the collar 308 via threaded holes and contacting an outer surface of the tightening ring 314, such that, when installed in the rotary machine 100, the fastener(s) 317 press(es) the tightening ring 314 against the shaft 102 of the rotary machine 100. In addition, some examples of the seal 128 may also include one or more set screws (e.g., at different circumferential positions) extending radially through the collar 308 via threaded holes and contacting the outer cylindrical surface 316 of the sleeve 306 at a portion of the sleeve 306 extending through the bore 304 and beyond the end face 300 of the of the end cap 130 (e.g., opposite the bulkhead 116), thereby coupling the collar 308 to the sleeve 306. In some examples, the tightening ring 314 may facilitate coupling the sleeve 306 to the shaft 102 of the rotary machine 100 without marring, deforming, and/or damaging the surface of the shaft 102 if, for example, set screws or bolts were used to directly contact the shaft 102 when coupling the sleeve 306 and collar 308 to the shaft 102. This may render it easier to disassemble parts from the shaft 102 that are unassembled by sliding over the portion of the shaft 102 to which the collar 308 and sleeve 306 are coupled.

In the example shown in FIG. 3, the seal 128 also includes a stationary seal face 318 coupled to the engagement face 302 of the end cap 130, and a rotating seal face 320 coupled to the outer cylindrical surface 316 of the sleeve 306 at a portion of the outer cylindrical surface 316 opposite the stationary seal face 318 when the sleeve 306 is received in the bore 304 of the end cap 130. In some examples, the stationary seal face 318 may be received in an annular recess 322 in the engagement face 302, for example, as shown in FIG. 3.

As shown in FIG. 3, the example stationary seal face 318 and the example rotating seal face 320 present opposing sealing surfaces that contact and slide with respect to one another, thereby providing at least a partial fluid seal, as the shaft 102, the sleeve 306, and the rotating seal face 320 rotate, and the end cap 130 and the stationary seal face 318 remain stationary. For example, the rotating seal face 320, which may be annular, rotates, contacts, and/or slides against the stationary seal face 318, which may also be annular. This example configuration results in providing at least a partial seal (e.g., a complete seal) at least partially preventing fluid in the chamber 112, which may be under pressure, passing the bulkhead 116 to a portion of the rotary machine 100 exterior with respect to the seal 128 and the chamber 112.

In some examples, the end cap 130 of the seal 128 may also include an annular recess 324 on the engagement face 302 adjacent the bore 304 that receives an annular seal 326 configured to provide a seal between the sleeve 306 and the end cap 130, for example, as the sleeve 306 rotates with respect to the annular seal 326, which may remain stationary with the end cap 130. The annular seal 326 may be any type of suitable seal, such as, for example, an O-ring seal or radial shaft seal. In some examples, the engagement face 302 of the end cap 130 may include an annular recess 328 remote from the bore 304, and the annular recess 328 may include an annular seal 330 in the annular recess 328, for example, as shown in FIG. 3. The annular seal 330 may be any type of suitable seal, such as, for example, an O-ring seal. In some examples, additional seals (e.g., O-ring seals and/or radial shaft seals) may be provided, for example, in the engagement face 302 of the end cap 130, in the inner cylindrical surface 310 of the sleeve 306, and/or around the stationary seal face 318, for example, as shown in FIG. 3.

The example seal 128 shown in FIG. 3 also includes a loading mechanism 332 configured to urge the rotating seal face 320 against the stationary seal face 318 to improve the effectiveness of the fluid seal provided by the seal 128. In the example shown, the loading mechanism 332 includes a spring 334 (e.g., a helical or coil spring) surrounding the outer cylindrical surface 316 of the sleeve 306. The spring 334 may be configured to provide a longitudinal force pressing against, at one end of the spring 334, a retainer 336 coupled the outer cylindrical surface 316 of the sleeve 306 at an end of the sleeve 306 remote from the end cap 130, and pressing against, at the opposite end of the spring 334, an annular slider 338 surrounding the outer cylindrical surface 316 of the sleeve 306, such that the rotating seal face 320 is pressed against the stationary seal face 318 via the annular slider 338, for example, as shown in FIG. 3. The loading mechanism 332, in some examples, may serve to pre-load the seal 128, such that the rotating seal face 320 is pressed against the stationary seal face 318.

Figure 4:
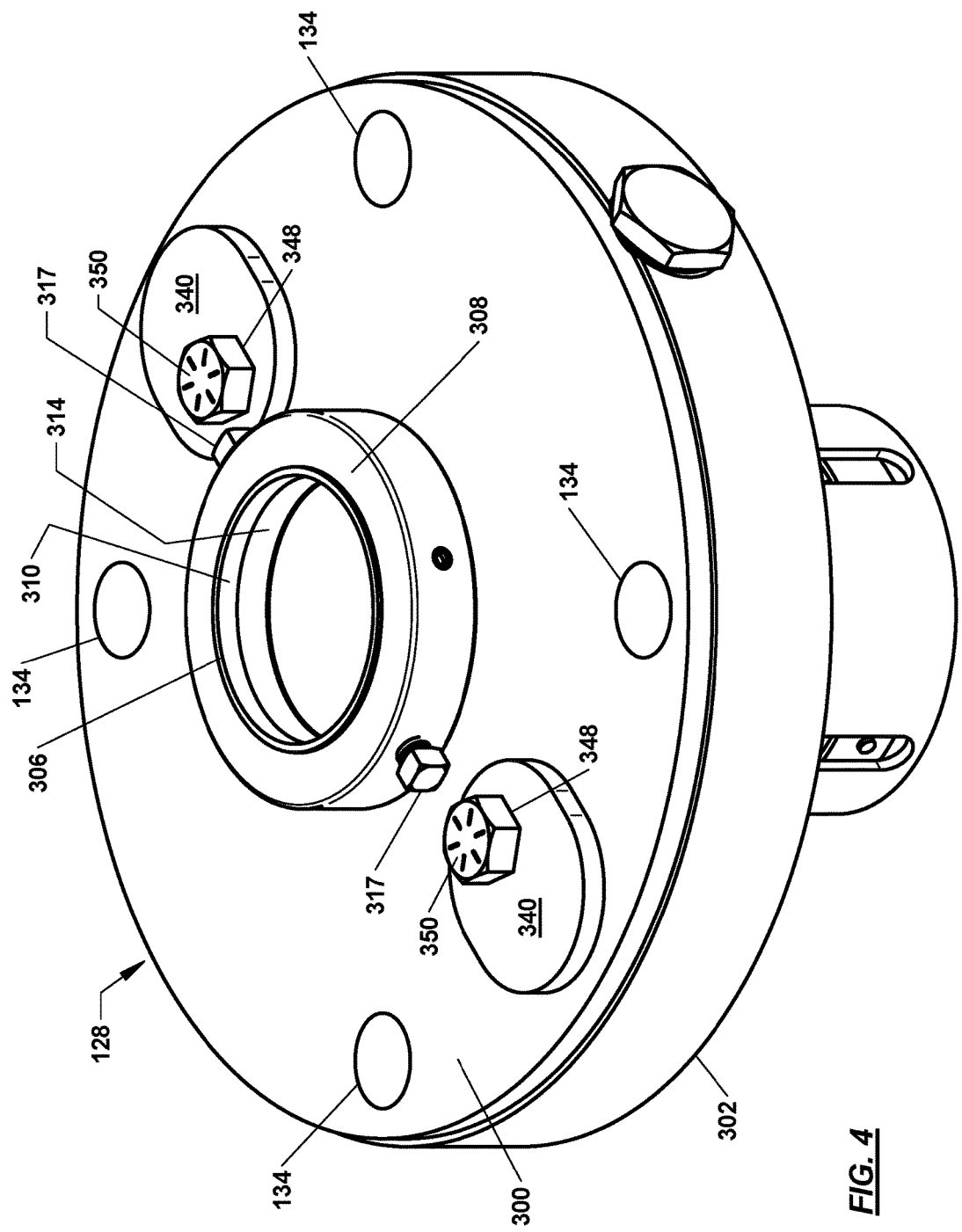
FIG. 4 is a perspective view of the example seal shown in FIG. 3 with example spacers moved from a spacing condition.

FIG. 4 is a perspective view of the example seal 128 shown in FIG. 3. As shown in FIGS. 3 and 4, the example seal 128 also includes two spacers 340 coupled to the end face 300 of the end cap 130 and configured to assist with installation of the seal 128, so that the loading mechanism 332 is pre-loaded a desired amount upon installation of the seal 128 in the rotary machine 100. The example spacers 340 shown are each a plate defining a first surface 342 and a second surface 344 opposing and separated from the first surface 342 by a plate thickness 346. In some examples, the first surface 342 and the second surface 344 are substantially parallel to one another. In the examples shown, the spacers 340 are each oval-shaped and include an aperture 348 extending from the first surface 342 to the second surface 344. In some examples, the aperture 348 may be located off-center with respect to the spacer 340, for example, as shown. In the example shown, the seal 128 also includes fasteners 350 extending through respective apertures 348 and coupling the spacers 340 to the end cap 130. Other configurations and shapes of the spacers 340 are contemplated. Some examples may include fewer or more spacers 340.

In the example shown, the spacers 340 each configured such that in a first position, for example, as shown in FIG. 3, at least a portion the spacer 340 is located between the collar 308 and the end face 300 of the end cap 130. In the first position, the thickness 346 of spacer 340 spaces the collar 308 from the end face 300 of the end cap 130. For example, the collar 308 includes an end surface 352 facing and spaced from the end face 300 of end cap 130, and the first surface 342 of the spacer 340 faces the end face 300 of the end cap 130, and the second surface 344 faces the end surface 352 of the collar 308. In the example first position, the spacers 340 may serve to assist with installation of the seal 128, so that the loading mechanism 332 is pre-loaded a desired amount upon installation of the seal 128 in the rotary machine 100. For example, spacers 340 may be moved into the first position, and the collar 308 may be positioned longitudinally on the sleeve 306, such that the collar 308 presses a portion of the spacer 340 against the end face 300 of the end cap 130, and thereafter the collar 308 may be secured to the sleeve 306 at that position, for example, by tightening one of more of the fasteners 317 and one or more of the set screws that couple the collar 308 to the sleeve 306, for example, as described previously herein. In some examples, the seal 128 may be a cartridge seal configured to form a unitary assembly, and the sleeve 306 may be positioned within the bore 304 of the end cap 130 prior to the installation process for the seal 128, for example, such that a portion of each of the spacers 340 coupled to the end cap 130 is in the first position between and contacted by the end face 300 of the end cap 130 and the end surface 352 of the collar 308.

In some examples, the spacers 340 may be configured to be selectively moved between the first position and a second position. For example, once the collar 308 has been secured to the sleeve 306, the spacers 340 may be configured to be selectively repositioned to the second position, for example, as shown in FIG. 4. For example, the spacers 340 may be repositioned to the second position, such that the spacers 340 are no longer between the collar 308 and the end face 300 of the end cap 130. In some examples, the fasteners 350 may be loosened an amount sufficient to facilitate pivoting the spacers 340 relative to the collar 308 and the sleeve 306 in a plane substantially parallel to the end face 300 of the end cap 130. Once moved to the second position, the fasteners 350 may be tightened an amount sufficient to retain the respective spacers 340 in the second position, for example, so that the spacers 340, the collar 308, and/or the sleeve 306 is/are not damaged as the sleeve 306 rotates with the shaft 102 during operation of the rotary machine 100.

In some examples, the first surface 342 and/or the second surface 344 of each of the spacers 340 may have a coefficient of friction less than 0.2, for example, less than 0.15, 0.10, or 0.05. For example, the first surface 342 and/or the second surface 344 of each of the spacers 340 may include polytetrafluoroethylene, for example, in the form of a coating or impregnation. In some examples, the spacers 340 may be formed from polytetrafluoroethylene. Other low friction materials are contemplated. Providing the spacers 340 with a low friction material may mitigate or prevent damage to the spacers 340, the collar 308, the sleeve 306, other portions of the seal 128, and/or rotary machine 100 if the spacers 340 are not moved from the space between the collar 308 and the end face 300 of the end cap 130 after setting the pre-load of the spring 334 in the seal 128.

In some examples, for example, as shown in FIG. 3, the end cap 130 may also include one or more threaded bores 354 extending from the end face 300 of the end cap 130 to the engagement face 302 of the end cap 130. The threaded bore(s) 354 may be configured to receive a threaded fastener (not shown). For example, the end cap 130 may include two or more threaded bores 354 configured to receive jack screws to assist with removal of the seal 128 (e.g., the end cap 130) from the bulkhead 116 of the rotary machine 100. For example, the jack screws may be tightened until they press against the surface of the bulkhead 116 and thereby force the end cap 130 and the bulkhead 116 to separate from one another. In some examples, the spacers 340 and the threaded bores 354 may positioned such that the threaded bores 354 are covered by the spacers 340 when the spacers 340 are in the second position, for example, as shown in FIG. 4.

A method for installing a seal on a rotary machine including a shaft may include providing a seal, for example, a seal such as the seal 128 described herein. For example, the seal may include an end cap defining an engagement face, an end face, and a bore. The seal may also include a sleeve received through the bore of the end cap, and a collar coupled to the sleeve adjacent the end face of the end cap. In some examples, the sleeve may be positioned longitudinally within the bore of the end cap such that a portion of a spacer coupled to the end cap is in a first position between and contacted by the end face of the end cap and an end surface of the collar. In some examples, the seal may be a cartridge seal configured to form a unitary assembly, and the sleeve may be positioned within the bore of the end cap prior to the installation process, such that a portion of a spacer coupled to the end cap is in the first position between and contacted by the end face of the end cap and the end surface of the collar. In some examples, the spacer may define a spacer thickness, and the portion of the spacer may serve to space the end face of the end cap and the end surface of the collar from one another by the spacer thickness, which, in some examples, may pre-load a loading mechanism, for example, as described herein.

In some examples of method, the method may include moving the sleeve onto the shaft of the rotary machine, such that the engagement face of the end cap abuts a portion of the rotary machine through which the shaft passes and rotates. The method may also include coupling the end cap to the portion of the rotary machine, such as, for example, a bulkhead of the rotary machine. The method may also include coupling the collar and the sleeve to the shaft of the rotary machine, and after the collar has been coupled to the sleeve and shaft, moving the portion of the spacer from the first position between the end face of the end cap and the end surface of the collar to a second position in which no portion of the spacer is between the end face of the end cap and the end surface of the collar.

For example, the spacer may be moveably coupled to the end cap, and moving the portion of the spacer from the first position to the second position may include pivoting the spacer relative to the collar and the sleeve in a plane substantially parallel to the end face of the end cap. In some examples, the method may further include securing the spacer in a fixed position relative to the end cap after moving the portion of the spacer from the first position to the second position. Some examples of the seal may include a fastener (e.g., a bolt) for securing the spacer in the first and/or second positions, for example, as described herein, and the fastener may be loosened to move the spacer between the first and second positions, and tightened once the spacer has been moved to the desired one of the first or second positons.

In some examples, the seal may include a rotating seal face configured to rotate with the sleeve, and a stationary seal face coupled to the end cap, for example, as described herein. In some examples of the seal, the rotating seal face and the stationary seal face may be configured to abut and slide relative to one another, for example, as described herein. In some examples of the method, positioning the sleeve within the bore of the end cap such that the portion of the spacer coupled to the end cap is in the first position may include pre-loading a spring biasing the rotating seal face and the stationary seal face against one another, for example, as described herein. In some examples, the spacer may define a spacer thickness, and the portion of the spacer may serve to space the end face of the end cap and the end surface of the collar from one another by the spacer thickness, which, in some examples, may provide a desired level of pre-load based at least in part on the thickness of the spacer by virtue of the spacer thickness causing compression of the spring by a distance corresponding to the desired pre-load.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the examples illustrated and described, and without departing from the spirit and scope of the present invention, which is set forth in the following claims.

What is claimed is:

1. A rotary machine comprising:
a shaft configured to be driven by a motor;
a chamber configured to be in flow communication with a fluid associated with the rotary machine;
a seal coupled to the shaft and the chamber and configured to provide at least a partial fluid seal between the chamber and a portion of the rotary machine exterior with respect to the seal and the chamber, the seal comprising:
an end cap coupled to the rotary machine, the end cap defining an end face and a bore;
a sleeve received through the bore of the end cap and coupled to the shaft of the rotary machine, the sleeve defining an inner cylindrical surface defining an annular recess;
a tightening ring received in the annular recess, wherein the tightening ring couples the sleeve to the shaft of the rotary machine;
a collar longitudinally aligned with the tightening ring and coupled to the sleeve; and
a fastener extending radially through the collar and contacting a radially outer surface of the tightening ring,
wherein the fastener presses the tightening ring against the shaft of the rotary machine without directly contacting the shaft.

2. The rotary machine of claim 1, further comprising a set screw extending radially through the collar and contacting an outer cylindrical surface of the sleeve, thereby coupling the collar to the sleeve.

3. The rotary machine of claim 1, further comprising a spacer coupled to the end face of the end cap, in a first position, such that at least a portion the spacer is between the collar and the end face of the end cap, and, in a second position, such that the portion of the spacer is not between the collar and the end face of the end cap.

4. The rotary machine of claim 3, wherein the spacer is configured to be selectively moved between the first position and the second position.

5. The rotary machine of claim 4, further comprising a fastener coupling the spacer to the end cap.

6. The rotary machine of claim 4, wherein the collar comprises an end surface facing and spaced from the end face of end cap, wherein the spacer comprises a first surface facing the end face of the end cap and a second surface facing the end surface of the collar, and wherein at least one of the first surface or the second surface has a coefficient of friction less than 0.2.

7. The rotary machine of claim 6, wherein at least one of the first surface or the second surface of the spacer comprises polytetrafluoroethylene.

8. The rotary machine of claim 3, wherein the spacer comprises a plate defining a first surface and a second surface opposing the first surface, and wherein the first surface and the second surface are substantially parallel to one another.

9. The rotary machine of claim 8, wherein the plate defines an aperture extending from the first surface to the second surface, and the seal further comprises a fastener extending through the aperture and coupling the plate to the end cap.

10. The rotary machine of claim 1, wherein the end cap further comprises a threaded bore extending from the end face of the end cap to an engagement face of the end cap abutting a portion of the rotary machine, and wherein the threaded bore is configured to receive a threaded fastener.

11. A method for installing a seal on a rotary machine comprising a shaft, the method comprising:
providing a seal comprising:
an end cap defining an engagement face, an end face, and a bore;
a sleeve received through the bore of the end cap; and
a collar coupled to the sleeve adjacent the end face of the end cap, such that a portion of a spacer coupled to the end cap is in a first position between and contacted by the end face of the end cap and an end surface of the collar, wherein the portion of the spacer spaces the end face of the end cap and the end surface of the collar from one another;
moving the sleeve onto the shaft of the rotary machine such that the engagement face of the end cap abuts a portion of the rotary machine though which the shaft passes and rotates;
coupling the end cap to the portion of the rotary machine;
coupling the collar and the sleeve to the shaft of the rotary machine;
moving the portion of the spacer from the first position between the end face of the end cap and the end surface of the collar; and
securing the spacer in a fixed position relative to the end cap after moving the portion of the spacer from the first position between the end face of the end cap and the end surface of the collar.

12. The method of claim 11, wherein the spacer is moveably coupled to the end cap, and wherein moving the portion of the spacer from the first position between the end face of the end cap and the end surface of the collar comprises pivoting the spacer relative to the collar and the sleeve in a plane substantially parallel to the end face of the end cap.

13. The method of claim 11, wherein the seal comprises:
a rotating seal face configured to rotate with the sleeve; and
a stationary seal face coupled to the end cap,
wherein the rotating seal face and the stationary seal face are configured to abut and slide relative to one another, and
wherein positioning the sleeve within the bore of the end cap such that the portion of a spacer coupled to the end cap is in the first position comprises pre-loading a spring biasing the rotating seal face and the stationary seal face against one another.

* * * * *